United States Patent

[11] 3,620,920

[72] Inventors Giancarlo Lancini
 Pavia;
 Piero Sensi, Milan, both of Italy
[21] Appl. No. 638,584
[22] Filed May 15, 1967
[45] Patented Nov. 16, 1971
[73] Assignee Lepetit S.p.A.
 Milan, Italy
[32] Priority May 18, 1966
[33] Great Britain
[31] 22,168/66

[54] PROCESS FOR THE MANUFACTURE OF PHYSIOLOGICALLY ACTIVE COMPOUNDS
 6 Claims, No Drawings

[52] U.S. Cl. .................................................. 195/28, 195/80, 195/51

[51] Int. Cl. ................................................. C12d 9/00
[50] Field of Search ........................................ 195/28, 80, 51

[56] References Cited
UNITED STATES PATENTS
3,317,401   5/1967   Nielson et al. ................. 195/51

Primary Examiner—Alvin E. Tanenholtz
Attorney—Joseph Hirschmann

ABSTRACT: Producing 2-nitroimidazoles, such as azomycin, by oxidizing the corresponding 2-aminomidazole with Streptomyces eurocidicus var. nitroxydans.

PROCESS FOR THE MANUFACTURE OF PHYSIOLOGICALLY ACTIVE COMPOUNDS

This invention relates to a new method for producing antibiotic substances. More particularly, the invention is concerned with the preparation of the known antibiotic azomycin and of its alkyl-substituted derivatives, of the general formula

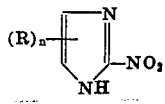

wherein R represents a lower alkyl group and n is an integer from 0 to 2 inclusive.

A primary purpose of this invention is to provide an advantageous process for preparing the known antibiotic substance, azomycin, and its homologues having antiprotozoal properties.

It is known that azomycin is produced by a micro-organism pertaining to the genus Nocardia, many characteristics of which resemble those of *Nocardia mesenterica* through the identity of the two micro-organisms could not be proved. The physiological and cultural characteristics of the azomycin producing strain are given in Journal of Antibiotics, 7A, 53 (1954).

Subsequently another azomycin producing micro-organism was found; it was named *Streptomyces eurocidicus* (Journal of Antibiotics, 8A, 105,1955).

We have now isolated from a sample of soil collected near Ivrea (Italy) a Streptomyces which has now been filed with the American Type Culture Collection receiving the number 19,551. The characteristics of said strain, hereinafter described, are quite similar to the ones of *streptomyces eurocidicus*. Moreover we have surprisingly discovered that the enzymatic activity of the new strain, which has been called *Streptomyces eurocidicus var. nitroxydans* ATCC 19,551 by us, can oxidize the amino group of some amino heterocyclic compounds to a nitro group. This effect allows the production of azomycin in high yield by cultivating *Streptomyces eurocidicus var. nitroxydans* ATCC 19,551 in a suitable culture medium and then introducing in said medium 2-aminoimidazole as starting compound, which can be easily prepared by known methods.

Moreover, we have discovered that not only azomycin can be prepared by this method, but that, if a substituted 2-aminoimidazole of the formula

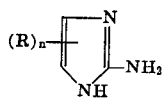

wherein R and n have the above significance, is added to the medium wherein *Streptomyces eurocidicus var. nitroxydans* ATCC 19,551 is carrying is carrying out the oxidation from 2-aminoimidazole to 2-nitroimidazole, also the corresponding substituted 2-nitroimidazoles are produced in high-yield. This is a very valuable improvement, because it is known that azomycin and its substituted derivatives are not easily prepared by chemical processes. The process mainly consists in adding the starting compound to the culture medium when the fermentation has arrived at a suitable degree and continuing the fermentation at a temperature of 25°–30° C. for 12–72 hours. A slight modification can be introduced by isolating and washing the mycelium at a suitable stage of its growth and suspending it in a fresh medium, to which the starting compound is then added. This method is preferably used when alkyl substituted imidazoles are to be prepared, because it decreases the concurrent formation of azomycin and makes the final purification easier.

The products are then recovered by conventional methods; the separation and purification are performed either chromatographically or, more advantageously, by a fractional crystallization.

The herein prepared alkylated 2-nitroimidazoles are known to possess, like azomycin, a high-activity against *Trichomonas vaginalis*. They are described for instance in Il Farmaco, Ed.Sci. 21,278 (1966) where also derivatives are reported having alkyl groups substituted on the nitrogen bearing a hydrogen atom. It is obvious that the herein prepared 2-nitroimidazoles can be useful also as intermediate compounds for obtaining the N-alkylated 2-nitroimidazoles, by entirely common procedures.

*Streptomyces eurocidicus var. nitroxydans* ATCC 19,551 is herein below described.

General characteristics of *Streptomyces eurocidicus var. nitroxydans* ATCC 19,551 to microscopical examination.

Substrate mycelium fine, profusely branched, usually 0.8 to 1.0 μin diameter. Aerial mycelium usually well developed on the standard media, initially white becoming light gray. Sporophores long and wavy; spirals not formed.

In table 1 are reported the cultural characteristics of *Streptomyces eurocidicus var. nitroxydans* ATCC 19551. The culture media used were prepared according to Waksman (S. A. Waksman, The Actinomycetes, Vol. 2, The Williams and Wilkins Co., 1961). The results of the carbon utilization tests (Pridham and Gottlieb, J. Bacteriol., 56, 107–114, 1948) are given in table 2 and, finally, in table 3 are given the results of some physiological tests.

TABLE 1.—CULTURAL CHARACTERISTICS OF *STREPTOMYCES EUROCIDICUS* VAR. *NITROXYDANS* ATCC 19551

| Media | Vegetative mycelium | Aerial mycelium | Soluble pigment |
|---|---|---|---|
| Oatmeal agar | Moderate growth, smooth surface; hyaline. | Moderate development and sporulation; cottony surface; white. | Absent. |
| Bennet agar | Moderate growth, smooth surface; light brown. | Moderate development, poor sporulation, cottony surface; ash gray to gray. | Light brown. |
| Czapeck-Dox agar. | No growth | | |
| Potato agar | Moderate growth, smooth surface; hyaline. | Moderate development and sporulation, cottony surface; white. | Absent. |
| Potato plug | Good growth, wrinkled; hyaline. | Traces of grayish white aerial mycelium; no spores. | Brown. |
| Glucose asparagine. | Moderate growth, smooth surface; hyaline. | Good development and sporulation; cottony surface; white. | |
| Do | Moderate growth, smooth surface, yellowish. | Moderate development and sporulation; cottony surface; white. | Pale yellow to amber. |
| Nutrient agar | Moderate growth, smooth surface; brown to red brown with violet tinge. | Absent | Brown. |
| Starch agar | Poor growth, smooth surface; hyaline. | do | Absent. |
| Ca malate | No growth | | |
| Tyrosine agar | Poor growth, smooth surface; hyaline. | Absent | Amber. |
| Egg albumin | do | Moderate development and sporulation; cottony surface; white. | Absent. |
| Cellulose agar | No growth | | |

TABLE 2

Utilization of carbon compounds by strain *Streptomyces eurocidicus var. nitroxydans* ATCC 19,551.

Carbon sources

| | |
|---|---|
| Arabinose | − |
| Xylose | − |
| Glucose | +++ |
| Galactose | − |
| Fructose | ± |
| Mannose | ± |
| Rhamnose | − |
| Lactose | − |

| | |
|---|---|
| Maltose | − |
| Sucrose | − |
| Raffinose | − |
| Glycerol | +++ |
| Sorbitol | − |
| Mannitol | − |
| Dulcitol | − |
| Inositol | ++ |
| Dextrin | +++ |
| Inulin | − |
| Starch | +++ |
| Ribose | +++ |
| Sorbose | − |

+++good growth; ++moderate growth; ±scarce growth; −no growth.

TABLE 3

Physiological characteristics of strain *Streptomyces euridicus var. nitroxydans* ATCC 19551.

| | Result |
|---|---|
| Starch | Hydrolysed |
| Gelatine | Slow a. partial hydrolysis |
| Nitrates | Not reduced |
| Melanine | Positive |
| Litmus milk | No changes |

The following nonlimitative examples illustrate the invention.

EXAMPLE 1

Preparation of 2-nitroimidazole

A volume of 100 ml. of culture medium of the following composition

| | |
|---|---|
| Soybean meal | 20 g. |
| Casein hydrolysate | 2 g. |
| Sodium chloride | 5 g. |
| Sodium nitrate | 5 g. |
| Maltose | 50 g. |
| $H_2O$ | 1,000 ml. |
| (Sterilized by heating at 120° C. for 20 minutes; pH after sterilization 6.5); | | is inoculated with 5 percent by volume of the fermentation broth apart prepared by cultivating the spores of *Streptomyces eurocidicus var. nitroxydans* ATCC 19,551 in a suitable culture medium. The vessel is heated at 28° C. on a shaker (200 r.p.m.), and, after 48 hours, 2-aminoimidazole is added in the amount of 100Y/ml. of the culture medium. Fermentation is carried out for 72 hours in the same conditions, then it stops; the broth is made slightly alkaline pH=8 with N sodium hydroxide and filtered on a suitable filter. The mycelium is repeatedly washed with water (pH=8) which is added to the filtrate, which is acidified with 10 percent aqueous hydrochloric acid. The resulting solution is extracted three times with the same volume of ethyl acetate, and the obtained solution is concentrated in vacuo until a product crystallizes out; it is azomycin, which can be purified by recrystallization; the melting point is 283°C.

By adding 100Y/ml. of 2-aminoimidazole, an amount of 2-nitroimidazole corresponding to a concentration of 170Y/ml. in the final fermentation broth is recovered. A control culture wherein 2-aminoimidazole was not added, yielded a concentration of 68Y/ ml. of azomycin, so that the yield is 74 percent.

EXAMPLE 2

Preparation of 4(5)-methyl-2-nitroimidazole

To 100 ml. of culture medium prepared and inoculated as described in example 1, an amount of 4(5)-methyl-2-aminomidazole corresponding to 100Y/ml. is added after 48 hours of fermentation at 30° C. After 120 hours an amount of 118Y/ml. of nitroimidazoles (i.e., comprising both 2-nitroimidazole and 4(5)-methyl-2-nitroimidazole) is extracted from the broth by ethyl acetate and separated with the method of fractional crystallization.

An amount corresponding to 55Y/ml. of 4(5)-methyl-2-nitroimidazoles and to 64Y/ml. of 2-nitroimidazole is obtained. The m.p. of 4(5)-methyl-2-nitroimidazole is 206° C.

EXAMPLE 3

Preparation of 4(5)-methyl-2-nitroimidazole

A jar containing 40 l. of culture medium of the following composition

| | |
|---|---|
| $MgSO_4$ | 0.5 g. |
| $NH_4NO_3$ | 10 g. |
| $KH_2PO_4$ | 0.624 g. |
| $Na_2HPO_4 \cdot 2H_2O$ | 0.376 g. |
| $CaCO_3$ | 10 g. |
| Glucose | 90 g. |
| $CuSO_4 \cdot H_2O$ | 0.0033 g. |
| $FeSO_4 \cdot H_2O$ | 0.01 g. |
| $ZnSO_4 \cdot H_2O$ | 0.05 g. |
| $MnSO_4 \cdot H_2O$ | 0.004 g. |
| $CoCl_2 \cdot H_2O$ | 0.002 g. |
| $(NH_4)_6Mo_7O_{24} \cdot 4H_2O$ | 0.001 g. |
| dist. $H_2O$ | 1,000 ml. |
| (Sterilized by heating at 120° C. for 15 minutes; pH after sterilization 6.2); | | is inoculated with 5 percent by vol. of the inoculum broth. The medium is kept at 25° C. and mechanically stirred at 500 r.p.m. Aeration is provided by insufflating sterile air at a rate of 0.5 l. of medium and per minute. After 48 hours fermentation the mycelium is filtered, washed with a buffer solution of phosphates and suspended in 40 l. of the same solution (it is buffered at pH 6.5). An amount of 6.7 g. of 4(5)-methyl-1-aminoimidazole is then added and the fermentation is then carried out in the same conditions as above. After 12 hours the broth is extracted with ethyl acetate and the separation of the products is made by chromatography on a column of silicagel, using a 1:1 mixture of diethyl ether-petroleum ether as the eluting solvent. An amount of 4.5 g. of 4(5)-methyl-2-nitroimidazole (X(52 percent) is obtained; m.p. 206°C.

EXAMPLE 4

Preparation of 4.5-diethyl-2-nitroimidazole

This compound is substantially prepared as above described in example 2 for 4(5)-methyl-2-nitroimidazole. The m.p. is 217°-1 C.

EXAMPLE 5 to 7

By the same process as described in the above Examples the following substituted 5-nitroimidazoles were also prepared:
  4(5)-ethyl-2-nitroimidazole, m.p. 152–154° C.
  4(5)-propyl-2-nitroimidazole, m.p. 140°–141° C.
  4(5)-isopropyl-1-nitroimidazole, m.p. 138°–139° C.

It is to be noted that in the case of a single substituent at the positions 4 and 5 of the imidazole ring, it is not possible to indicate unequivocally which of said positions is substituted, since they are fully equivalent. This is commonly obviated by indicating that the substituent is at position 4(5).

We claim:

1. A process for preparing a 2-nitroimidazole of the formula

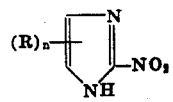

wherein R is a lower alkyl group and $n$ is an integer from 0 to 2 inclusive, which comprises subjecting a 2-aminoimidazole of the formula

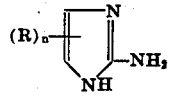

wherein R and n have the above significance, to the enzymic activity produced by the fermentation of *Streptomyces eurocidicus var. nitroxydans*, and recovering the obtained 2-nitroimidazole from the medium.

2. A process as in claim 1, wherein the starting compound is added to the fermentation medium of *Streptomyces eurocidicus var. nitroxydans* and fermentation is continued for 12–72 hours at 25°–30° C.

3. A process as in claim 1, wherein the compound subjected to the enzymic activity produced by *Streptomyces eurocidicus var. nitroxydans* is 2-aminoimidazole.

4. A process as in claim 1, wherein the compound subjected to the enzymic activity produced by *Streptomyces eurocidicus var. nitroxydans* is 4(5)-methyl-2-aminoimidazole.

5. A process as in claim 1, wherein the compound subjected to the enzymic activity produced by *Streptomyces eurocidicus var. nitroxydans* is 4,5-dimethyl-2-aminoimidazole.

6. A process as in claim 1, wherein the starting 2-aminoimidazole is contacted with the mycelium of *Streptomyces eurocidicus var. nitroxydans*, the product separated by filtration from the fermentation medium, and suspended in fresh medium.

* * * * *